US008885639B1

(12) United States Patent
Robbins

(10) Patent No.: US 8,885,639 B1
(45) Date of Patent: Nov. 11, 2014

(54) METHOD AND SYSTEM FOR PROVIDING TALKING CALL WAITING IN A SIP-BASED NETWORK

(75) Inventor: David C Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1695 days.

(21) Appl. No.: 11/534,308

(22) Filed: Sep. 22, 2006

Related U.S. Application Data

(60) Provisional application No. 60/719,465, filed on Sep. 22, 2005.

(51) Int. Cl.
*H04L 12/66* (2006.01)
*H04M 11/00* (2006.01)

(52) U.S. Cl.
USPC ........... 370/353; 370/354; 370/355; 370/356; 379/88.13; 379/88.14

(58) Field of Classification Search
CPC .................. H04M 3/42017; H04L 29/06027; H04L 65/1069; H04L 65/1096; H04L 67/306; H04L 67/14; H04L 29/12094; H04L 61/1529; H04L 65/1006; H04W 68/00
USPC ........... 370/352–356, 260; 379/88.13, 88.14, 379/142.08, 215.01
See application file for complete search history.

(56) References Cited

U.S. PATENT DOCUMENTS

| | | |
|---|---|---|
| 3,737,587 A | 6/1973 | Romero |
| 4,154,987 A | 5/1979 | Rosenberg et al. |
| 4,528,424 A | 7/1985 | Middleton et al. |
| 4,723,271 A | 2/1988 | Grundtisch |
| 4,741,024 A | 4/1988 | Del Monte et al. |
| 4,950,011 A | 8/1990 | Borcea et al. |
| 5,165,095 A | 11/1992 | Borcherding |
| 5,323,444 A | 6/1994 | Ertz et al. |
| 5,471,519 A | 11/1995 | Howe et al. |
| 5,475,745 A | 12/1995 | Boyle |
| 5,619,561 A | 4/1997 | Reese |
| 5,815,550 A | 9/1998 | Miller |
| 5,835,570 A | 11/1998 | Wattenbarger |
| 5,913,166 A | 6/1999 | Buttitta et al. |
| 5,970,134 A | 10/1999 | Highland et al. |
| 5,999,610 A | 12/1999 | Lin et al. |
| 6,021,176 A | 2/2000 | McKendry et al. |
| 6,026,156 A | 2/2000 | Epler et al. |
| 6,031,896 A | 2/2000 | Gardell et al. |
| 6,072,865 A | 6/2000 | Haber et al. |
| 6,208,726 B1 | 3/2001 | Bansal et al. |
| 6,219,414 B1 * | 4/2001 | Maciejewski et al. ... 379/215.01 |
| 6,337,898 B1 | 1/2002 | Gordon |
| 6,339,639 B1 * | 1/2002 | Henderson ............... 379/142.08 |

(Continued)

OTHER PUBLICATIONS www.carrollcommunications.com/ipoffice/5donotdisturb.html, p. 1 of 2, Nov. 2007.

(Continued)

*Primary Examiner* — Luat Phung
*Assistant Examiner* — Kai Chang

(57) ABSTRACT

A method and system of an embodiment of the present invention may include receiving a call request directed to a called party, identifying announcement information associated with the call request, inserting the announcement information into a field of the call request and forwarding the call request.

18 Claims, 5 Drawing Sheets

(56) References Cited

U.S. PATENT DOCUMENTS

| | | | |
|---|---|---|---|
| 6,404,876 B1 | 6/2002 | Smith et al. | |
| 6,484,196 B1 | 11/2002 | Maurille | |
| 6,510,315 B1 | 1/2003 | Arnson | |
| 6,636,594 B1 | 10/2003 | Oran | |
| 6,735,295 B1* | 5/2004 | Brennan et al. | 379/215.01 |
| 6,741,695 B1 | 5/2004 | McConnell et al. | |
| 6,744,877 B1 | 6/2004 | Edwards | |
| 6,754,325 B1 | 6/2004 | Silver et al. | |
| 6,801,604 B2 | 10/2004 | Maes et al. | |
| 6,807,259 B1 | 10/2004 | Patel et al. | |
| 6,826,174 B1 | 11/2004 | Erekson et al. | |
| 6,834,048 B1* | 12/2004 | Cho et al. | 370/356 |
| 6,856,616 B1 | 2/2005 | Schuster et al. | |
| 6,857,072 B1 | 2/2005 | Schuster et al. | |
| 6,870,830 B1 | 3/2005 | Schuster et al. | |
| 6,876,632 B1 | 4/2005 | Takeda | |
| 6,879,673 B2 | 4/2005 | Creamer et al. | |
| 6,954,521 B2* | 10/2005 | Bull et al. | 379/142.08 |
| 6,954,524 B2 | 10/2005 | Gibson | |
| 6,961,332 B1 | 11/2005 | Li et al. | |
| 6,963,633 B1 | 11/2005 | Diede et al. | |
| 6,965,614 B1 | 11/2005 | Osterhout et al. | |
| 6,985,961 B1 | 1/2006 | Ramsayer et al. | |
| 6,996,605 B2 | 2/2006 | Low et al. | |
| 7,020,130 B2 | 3/2006 | Krause et al. | |
| 7,031,700 B1 | 4/2006 | Weaver et al. | |
| 7,039,710 B2 | 5/2006 | Khartabil | |
| 7,050,559 B2 | 5/2006 | Silver et al. | |
| 7,082,193 B2 | 7/2006 | Barclay et al. | |
| 7,085,253 B2 | 8/2006 | Yang | |
| 7,130,282 B2 | 10/2006 | Black | |
| 7,145,997 B2 | 12/2006 | Poikselka et al. | |
| 7,203,293 B1 | 4/2007 | Bedingfield | |
| 7,224,792 B2* | 5/2007 | Fusco | 379/374.02 |
| 7,257,837 B2 | 8/2007 | Xu et al. | |
| 7,260,201 B2 | 8/2007 | Jorasch et al. | |
| 7,274,662 B1 | 9/2007 | Kalmanek et al. | |
| 7,283,517 B2 | 10/2007 | Yan et al. | |
| 7,290,288 B2 | 10/2007 | Gregg et al. | |
| 7,295,577 B2 | 11/2007 | Moody et al. | |
| 7,301,913 B2 | 11/2007 | Corrao et al. | |
| 7,406,696 B2 | 7/2008 | Burger et al. | |
| 7,426,265 B2 | 9/2008 | Chen et al. | |
| 7,440,440 B1 | 10/2008 | Abichandani et al. | |
| 7,460,657 B1 | 12/2008 | Baeza | |
| 7,489,771 B2 | 2/2009 | McMurry et al. | |
| 7,564,846 B2* | 7/2009 | Dezonno et al. | 370/392 |
| 7,580,497 B2 | 8/2009 | Wang et al. | |
| 7,587,031 B1 | 9/2009 | Ress et al. | |
| 7,593,389 B2 | 9/2009 | Vance | |
| 7,599,355 B2 | 10/2009 | Sunstrum | |
| 7,602,901 B1* | 10/2009 | Kates et al. | 379/373.01 |
| 7,609,700 B1 | 10/2009 | Ying et al. | |
| 7,609,706 B2 | 10/2009 | Scott et al. | |
| 7,630,481 B2 | 12/2009 | Kafka | |
| 7,715,413 B2 | 5/2010 | Vaziri et al. | |
| 7,743,141 B2 | 6/2010 | Wang et al. | |
| 7,773,581 B2 | 8/2010 | Punj et al. | |
| 7,813,490 B2* | 10/2010 | DeMent et al. | 379/221.03 |
| 7,849,205 B2* | 12/2010 | Pounds et al. | 709/230 |
| 7,860,089 B2 | 12/2010 | Tripathi et al. | |
| 8,036,360 B1 | 10/2011 | Gogineni et al. | |
| 8,059,805 B2 | 11/2011 | Claudatos et al. | |
| 8,116,302 B1 | 2/2012 | Robbins | |
| 8,379,824 B2* | 2/2013 | Jackson et al. | 379/207.16 |
| 2002/0038388 A1 | 3/2002 | Netter | |
| 2002/0114318 A1 | 8/2002 | Rines | |
| 2002/0131447 A1 | 9/2002 | Krishnamurthy et al. | |
| 2002/0136359 A1 | 9/2002 | Stumer et al. | |
| 2002/0136363 A1 | 9/2002 | Stumer et al. | |
| 2002/0137495 A1* | 9/2002 | Gabrysch | 455/414 |
| 2002/0141548 A1 | 10/2002 | Boda | |
| 2002/0156900 A1 | 10/2002 | Marquette et al. | |
| 2003/0007483 A1* | 1/2003 | Um | 370/352 |
| 2003/0028806 A1 | 2/2003 | Govindarajan et al. | |
| 2003/0043992 A1 | 3/2003 | Wengrovitz | |
| 2003/0088421 A1 | 5/2003 | Maes et al. | |
| 2003/0231759 A1 | 12/2003 | Bedingfield, Sr. et al. | |
| 2004/0030750 A1 | 2/2004 | Moore et al. | |
| 2004/0037403 A1* | 2/2004 | Koch | 379/142.16 |
| 2004/0051900 A1 | 3/2004 | Sagiya et al. | |
| 2004/0082324 A1 | 4/2004 | Ayoub | |
| 2004/0090954 A1* | 5/2004 | Zhang et al. | 370/352 |
| 2004/0148395 A1 | 7/2004 | Schulzrinne | |
| 2004/0174983 A1* | 9/2004 | Olschwang et al. | 379/377 |
| 2004/0207724 A1 | 10/2004 | Crouch et al. | |
| 2004/0240656 A1 | 12/2004 | Poustchi | |
| 2004/0243680 A1 | 12/2004 | Mayer | |
| 2004/0249951 A1* | 12/2004 | Grabelsky et al. | 709/227 |
| 2004/0264406 A1 | 12/2004 | Pattenden et al. | |
| 2005/0013421 A1 | 1/2005 | Chavez et al. | |
| 2005/0043014 A1 | 2/2005 | Hodge | |
| 2005/0069104 A1* | 3/2005 | Hanson et al. | 379/88.19 |
| 2005/0078642 A1 | 4/2005 | Mayer et al. | |
| 2005/0123104 A1 | 6/2005 | Bishop et al. | |
| 2005/0129219 A1 | 6/2005 | Williamson | |
| 2005/0147227 A1 | 7/2005 | Chervirala et al. | |
| 2005/0190721 A1 | 9/2005 | Pershan | |
| 2005/0193338 A1 | 9/2005 | Hawkins et al. | |
| 2005/0195802 A1 | 9/2005 | Klein et al. | |
| 2005/0201530 A1 | 9/2005 | Koch et al. | |
| 2005/0213716 A1 | 9/2005 | Zhu et al. | |
| 2005/0215243 A1 | 9/2005 | Black et al. | |
| 2005/0226217 A1 | 10/2005 | Logemann et al. | |
| 2005/0237978 A1 | 10/2005 | Segal | |
| 2005/0249196 A1 | 11/2005 | Ansari et al. | |
| 2005/0286466 A1 | 12/2005 | Tagg et al. | |
| 2006/0023658 A1* | 2/2006 | Phillips et al. | 370/328 |
| 2006/0033809 A1 | 2/2006 | Farley | |
| 2006/0039389 A1 | 2/2006 | Burger et al. | |
| 2006/0050648 A1 | 3/2006 | Eydelman | |
| 2006/0050682 A1* | 3/2006 | Vance | 370/352 |
| 2006/0062210 A1 | 3/2006 | Dharanikota | |
| 2006/0062251 A1 | 3/2006 | Lim et al. | |
| 2006/0067300 A1 | 3/2006 | Poustchi et al. | |
| 2006/0067504 A1 | 3/2006 | Goldman et al. | |
| 2006/0140379 A1 | 6/2006 | Yamamoto et al. | |
| 2006/0140380 A1* | 6/2006 | Croak et al. | 379/215.01 |
| 2006/0146737 A1 | 7/2006 | Sandgren et al. | |
| 2006/0153342 A1 | 7/2006 | Sasaki | |
| 2006/0165060 A1 | 7/2006 | Dua | |
| 2006/0177030 A1 | 8/2006 | Rajagopalan et al. | |
| 2006/0177044 A1 | 8/2006 | O'Neil et al. | |
| 2006/0178130 A1 | 8/2006 | Makrygiannis | |
| 2006/0203986 A1 | 9/2006 | Gibson | |
| 2006/0218283 A1 | 9/2006 | Jones et al. | |
| 2006/0221176 A1 | 10/2006 | Di Pietro et al. | |
| 2006/0251229 A1 | 11/2006 | Gorti et al. | |
| 2006/0285533 A1 | 12/2006 | Divine et al. | |
| 2006/0286984 A1 | 12/2006 | Bonner | |
| 2007/0025270 A1 | 2/2007 | Sylvain | |
| 2007/0058613 A1 | 3/2007 | Beckemeyer | |
| 2007/0083658 A1 | 4/2007 | Hanna et al. | |
| 2007/0092073 A1 | 4/2007 | Olshansky et al. | |
| 2007/0111723 A1 | 5/2007 | Ahmed et al. | |
| 2007/0143858 A1 | 6/2007 | Hearty | |
| 2007/0147601 A1* | 6/2007 | Tischer | 379/373.02 |
| 2007/0280469 A1 | 12/2007 | Baker et al. | |
| 2008/0049724 A1 | 2/2008 | Tsujino et al. | |
| 2008/0126549 A1 | 5/2008 | Khanchandani et al. | |

OTHER PUBLICATIONS www.cisco.com/en/U/s/products/sw/voicesw/ps556/products_administration_guide, pp. 3-5 of 26, Oct. 2007.

Rosenberg et al. "RFC 3261, SIP: Session Initiation Protocol", The Internet Society, Jun. 2002.

Newton's Telecom Dictionary 22nd Edition, p. 829, Feb. 2006.

Sparks, "RFC 3515—The Session Initiation Protocol (SIP) Refer Method," The Internet Society, Apr. 2003.

Mahy et al., "RFC 3891—The Session Initiation Protocol (SIP) 'Replaces' Header," The Internet Society, Sep. 2004.

Mahy et al, "RFC 3911—The Session Initiation Protocol (SIP) 'Join' Header," The Internet Society, Oct. 2004.

(56) References Cited

OTHER PUBLICATIONS

Handley et al., "RFC 2327—SDP: Session Description Protocol," The Internet Society, Apr. 1998.
Schulzrinne et al., "RFC 1889—RTP: A Transport Protocol for Real-Time Applications," The Internet Society, Jan. 1996.
Schulzrinne et al., "RFC 2833—RTP Payload for DTMF Digits, Telephony Tones and Telephony Signals," The Internet Society, May 2000.
Mahy et al., "draft-ietf-sip-join-03—The Session Initiation Protocol (SIP) "Join" Header," The Internet Society, Feb. 2004.
Mahy et al., "draft-ietf-sipping-cc-framework-03—A Call Control and Multi-party usage framework for the Session Initiation Protocol (SIP)," The Internet Society, Oct. 27, 2003.
Rosenberg, "RFC 3311—The Session Initiation Protocol (SIP) Update Method," The Internet Society, Sep. 2002.
Rosenberg et al., "RFC 3262—Reliability of Provisional Responses in the Session Initiation Protocol (SIP)," The Internet Society, Jun. 2002.
Jennings et al., "RFC 3325—Private Extensions to the Session Initiation Protocol (SIP) for Asserted Identity within Trusted Networks," The Internet Society, Nov. 2002.
Harrington et al., "RFC 3411—An Architecture for Describing Simple Network Management Protocol (SNMP) Management Frameworks," The Internet Society, Dec. 2002.
Rosenberg et al., "RFC 3840—Indicating User Agent Capabilities in the Session Initiation Protocol (SIP)," The Internet Society, Aug. 2004.
Mahy, "RFC 3842—A Message Summary and Message Waiting Indication Event Package for the Session Initiation Protocol (SIP)," The Internet Society, Aug. 2004.
"SR-504: SPCS Capabilities and Features," Telcordia Technologies, Issue 1, Mar. 1996.
"SR-3065: LSSGR Guide," Telcordia Technologies, Issue 7, Aug. 2003.
Mahy et al., "draft-ietf-sip-replaces-05—The Session Initiation Protocol (SIP) "Replaces" Header," The Internet Society, Feb. 16, 2004.
Schulzrinne, "draft-ietf-sipping-sos-00—Emergency Services URI for the Session Initiation Protocol," The Internet Society, Feb. 8, 2004.
Rosenberg et al., "draft-ietf-sipping-dialog-package-04—An INVITE Initiated Dialog Event Package for the Session Initiation Protocol (SIP)," The Internet Society, Feb. 13, 2004.
Lingle et al., "draft-ietf-sip-mib-08—Management Information Base for Session Initiation Protocol (SIP)," The Internet Society, Jul. 16, 2004.
Johnston et al., "draft-ietf-sipping-cc-conferencing-04—Session Initiation Protocol Call Control—Conferencing for User Agents," The Internet Society, Jul. 18, 2004.
Sparks et al., "draft-ietf-sipping-cc-transfer-02—Session Initiation Protocol Call Control—Transfer," The Internet Society, Feb. 15, 2004.
Rosenberg et al., "draft-ietf-sipping-conference-package-04—A Session Initiation Protocol (SIP) Event Package for Conference State," The Internet Society, May 21, 2004.
Petrie, "draft-ietf-sipping-config-framework-04—A Framework for Session Initiation Protocol User Agent Profile Delivery," The Internet Society, Jul. 19, 2004.
"GR-1298-CORE—AINGR: Switching Systems," Telcordia Technologies, Issue 6, Nov. 2000.

* cited by examiner

METHOD AND SYSTEM FOR PROVIDING TALKING CALL WAITING IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

An exemplary embodiment of the present invention provides talking call waiting over a SIP based network to an analog based device. The talking call waiting may alert the called party by injecting an announcement into an audio signal to be heard by the called party. The announcement may include the caller's phone number, name and/or other call identifying data. In addition, the announcement may be a personalized message, voice signal and/or other audio. The announcement may be synthesized and may allow the user to respond using call waiting functionality.

Figure 1:
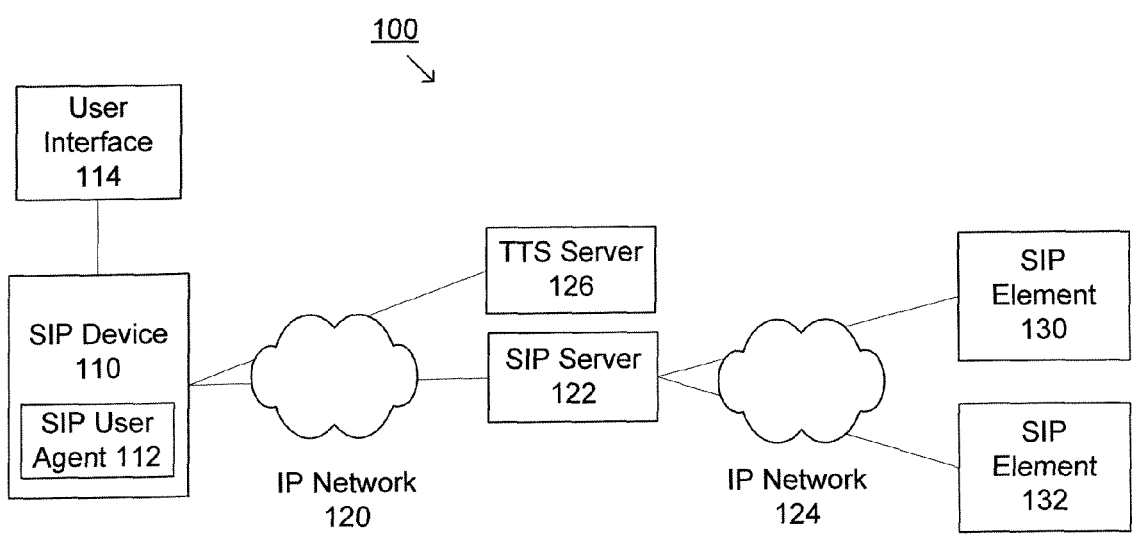
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular, talking call waiting. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP element 132, through IP Network 124. TTS Server 126 may provide text to speech synthesis functionality to SIP elements through IP network 120. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voice-band or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

TTS Server 126 may represent a Text To Speech (TTS) server that may respond to a request, such as a Text to Speech HTTP request, from SIP Device 110. For example, TTS Server 126 may respond to a HTTP Get request with a call waiting announcement text provided in the URL of the request from SIP Device 110. In response to the request, TTS Server 126 may synthesize an audio file containing the talking call waiting text and may return the audio file to SIP Device 110. In some embodiments, the audio file may be returned as streaming audio, according to another embodiment of the present invention. SIP Device 110 may insert the audio file into a signal sent to User Interface 114.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

In the preferred embodiment, SIP User Agent 112 may receive an INVITE request from a SIP element while SIP Device 110 is currently engaged in a call with another SIP element. For example, SIP User Agent 112 may receive an INVITE request which may include a SDP (Session Description Protocol) offer which may be in compliance with RFC 3264, "An Offer/Answer Model with Session Description Protocol." Other protocol standards may be used. A SIP User Agent 112 may construct an audio message which identifies the call using one or more characteristics of the call. For example, the audio message may be inserted into the audio signal to be heard by the called party. In some embodiments, this may interrupt the audio signal from the other SIP element currently engaged in a call with SIP Device 110 while the audio message is transmitted. The identifying characteristics of the audio message may include the caller's name, the caller's phone number, other identifying attributes of the caller and/or other data. Other examples contemplate a SIP Device enabling the personalization of announcements to user specified numbers. For example, a user may specify a ring tone to be associated with a specified phone number. A message may also announce a call without providing identifying characteristics of the call. In one or more embodiments, a SIP Server 122 may construct text representing the Talking Call Waiting (TCW) announcement and insert a URL referencing the TCW text into a constructed Alert Info Header of a INVITE request before sending the INVITE request to SIP Device 110. According to an embodiment of the present invention, SIP User Agent 112 may be configured with a cancel call waiting code. In such embodiments, SIP User Agent 112 may enable a user to dial the cancel call waiting service code as a prefix to an outbound call, following a service request or in conditions. For example, dialing a cancel call waiting service code prior to an outbound call may disable call waiting for the duration of the call. Dialing a cancel call waiting service code following a service request may provide a confirmation tone to a user, return a user to a current call and may respond to any subsequent call requests with a busy signal for the duration of the call.

Figure 2:
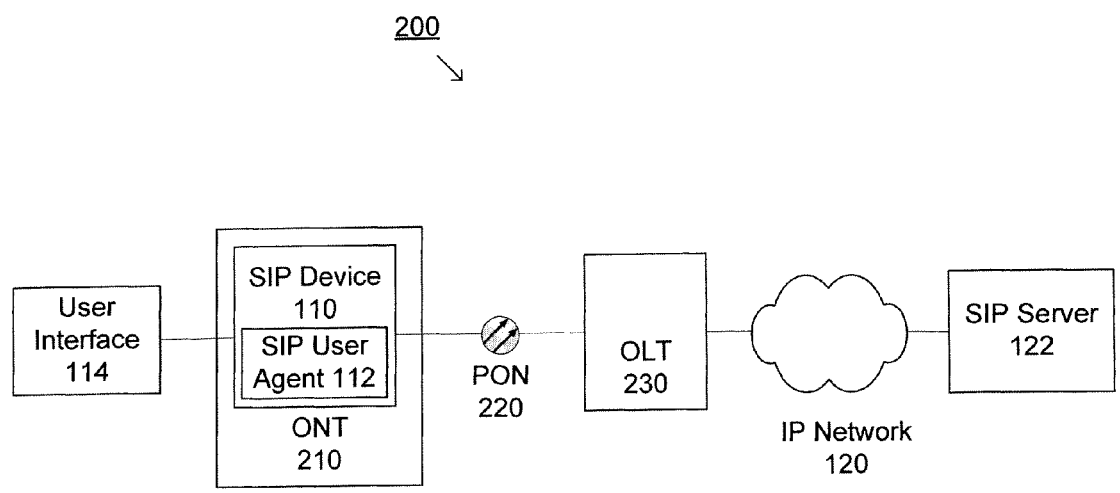
FIG. 2 illustrates an exemplary implementation where a SIP Device is embedded in a FTTP network, according to an embodiment of the present invention.
Figure 3:
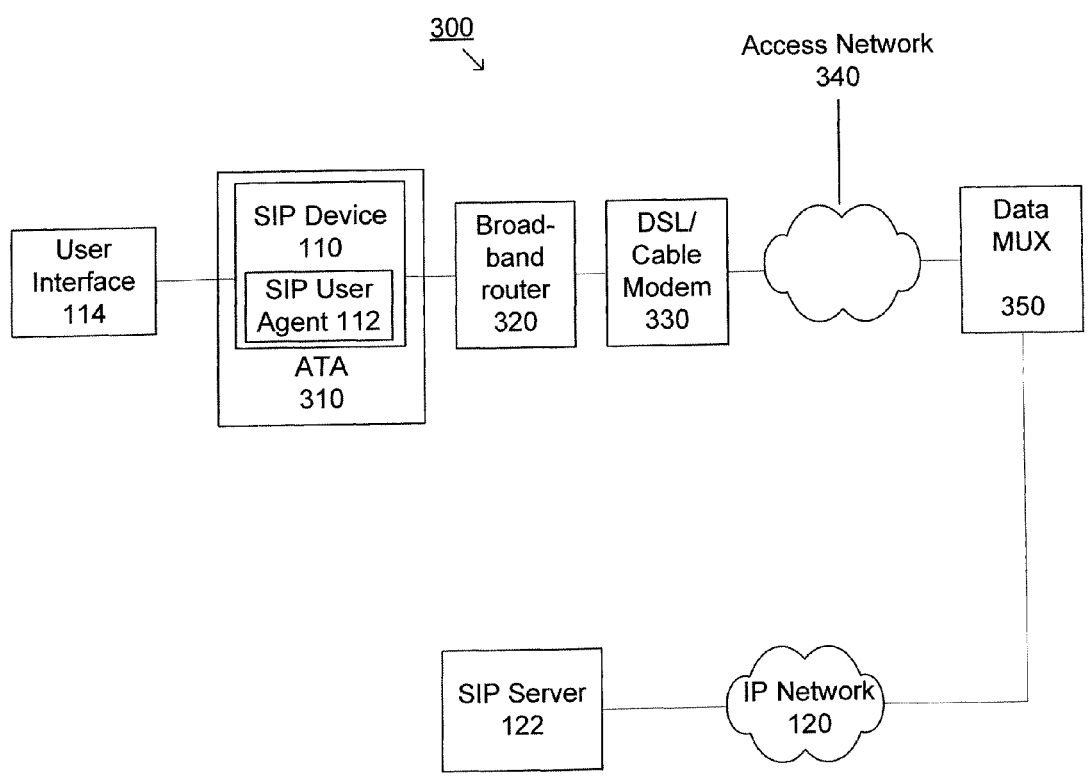
FIG. 3 illustrates an exemplary implementation where a SIP Device is embedded in an ATA device attached to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephony Adaptor (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

Figure 4:
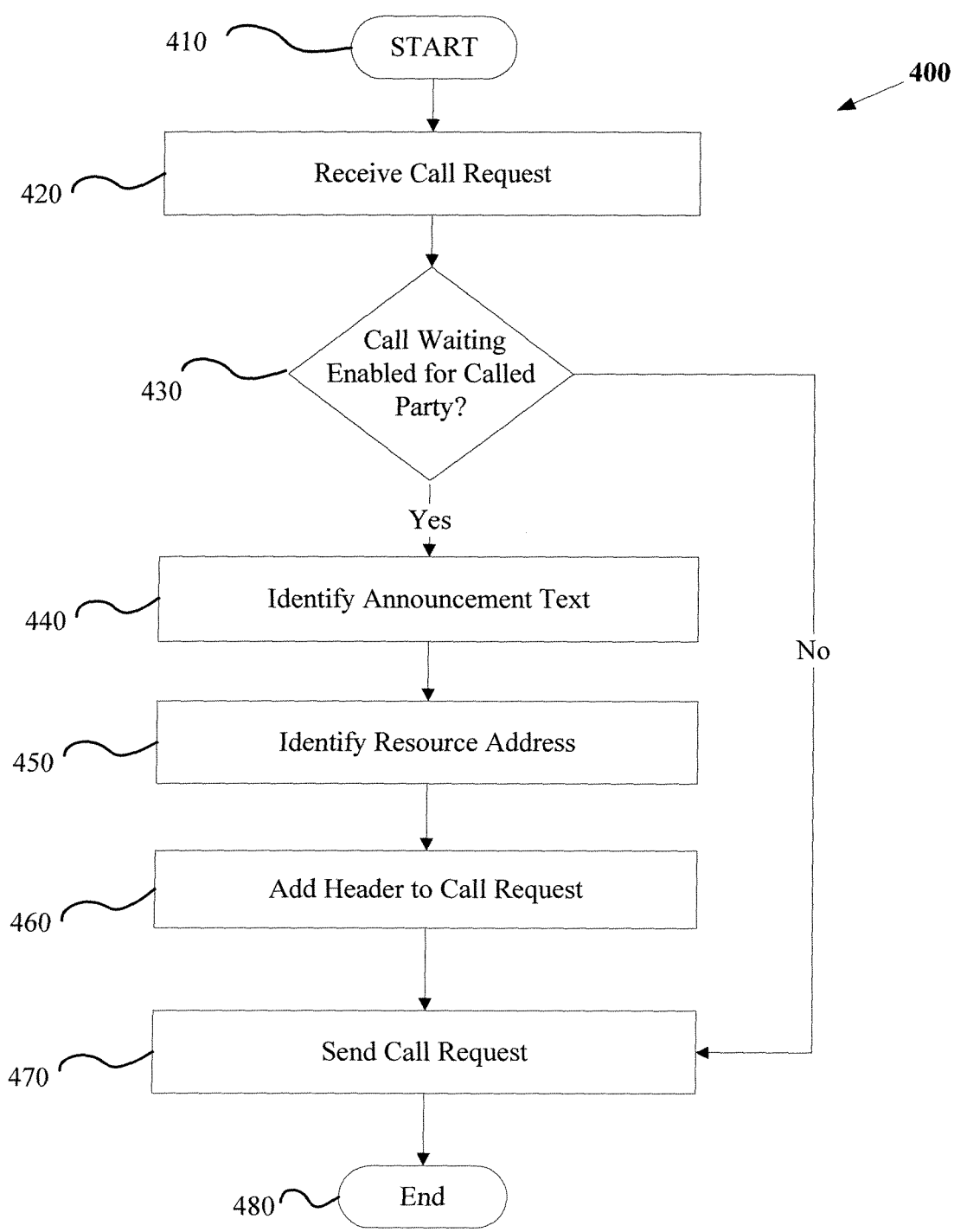
FIG. 4 is a flowchart depicting a method of providing announcement text in a call request, according to an embodiment of the present invention.

FIG. 4 provides a flow chart depicting an exemplary method for enabling an announcement associated with a call request, according to an embodiment of the present invention. According to one or more embodiments, flow chart 400 may begin at step 410.

At step 420, a call request to a called party may be received. In one or more embodiments, the call request may be an INVITE request received over a SIP based network, for example, on behalf of a calling party. The INVITE request may be a SIP INVITE request that complies with RFC 3261 and may include a Session Description Protocol (SDP) offer which may be in compliance with RFC 3264, "An Offer/Answer Model with Session Description Protocol." In some embodiments, other protocol standards may be used. The call request may be received by a SIP server associated with the called party on a SIP based network.

At decision block 430, it may be determined whether the called party has the call waiting service enabled. For example, the SIP server associated with the called party may query certain information associated with the called party to determine if the called party has subscribed to the call waiting service. Such information may be stored at SIP server or located elsewhere and accessible via the IP network. If the called party does not have the call waiting service enabled, processing may continue to step 470 for normal call processing. Otherwise, the process continues to step 440. In some embodiments, the determination of this decision block 430 may be omitted.

At step 440, announcement information may be associated with the call request. According to an embodiment of the present invention, announcement information may be identified or constructed at a SIP server or other network element. The announcement information may be based on and/or contain identifying criteria of a calling party. By way of non-limiting example, identifying criteria of a calling party may include a calling party name, a calling party number, call origin location or other call request attributes. In some embodiments, announcement information may contain text of a generic announcement of the incoming call, such as "Incoming call from <phone number>.".

According to other exemplary embodiments, the announcement may be customized. For example an announcement such as "Bob's cell phone" may be announced with a certain call. A SIP server or other network device may store a mapping of user provided audio labels which may be associated with phone numbers so that the phone number or other identifying criteria of an incoming call may be associated with a customer provided audio label. In some embodiments, a user may be able to dial a phone number, type in an identifying phone number to be labeled, be prompted for a message and then record a message to be played when a call is received from the identified number. In some embodiments, a user may be provided with a phone menu to choose among recording customized announcements for user provided phone numbers, choosing ring tones for user provided phone numbers, choosing sound effects for user provided numbers, and/or choosing other audio signals to identify user provided numbers. Other examples may contemplate providing a web based interface to allow a user to specify ring tones, sound effects, customized announcements and/or other audio signals for specified numbers. Users may specify a default audio signal for numbers not customized. In other embodiments, a device at the customer premises or other location may store a mapping of user specified phone numbers to customized announcements. In addition, the announcement may be personalized by the calling party, receiving party or other entity.

At step 450, a resource address may be identified. A resource address may be a URL or other address identifying a server accessible on an IP network. For example, the address may be the address of a text-to-speech server available over the IP network. In such a case, the URL may contain the announcement text to be submitted to the text to speech server. In one or more embodiments, a SIP server may construct the announcement text. According to other examples, an additional resource address such as a URI referencing a notification alert pattern may be identified. In one or more embodiments a SIP server may construct the URI. In other examples, the address may identify a server capable of providing a ring tone associated with a phone number. Other resource addresses may provide call identifying attributes specified in a URL.

At step 460, the announcement information may be added to the call request. In some embodiments, the SIP server may add the announcement information to a header of the call request. According to an embodiment, the call request may be a SIP INVITE request containing an "alert info" field in the header (such as specified in RFC 3261), and the added announcement information is inserted in the "alert info" field. In some embodiments, the announcement information is a URL containing an address of a text-to-speech server and announcement text associated with the call request. In other embodiments the announcement information is a URL of a server resource accessible via the IP network (e.g., a server capable of providing).

At step 470, the call request may be sent. In some examples, the call request may be sent by a SIP server to a SIP device on an IP network. Other implementations may be realized.

At step 480, the process may end.

Figure 5:
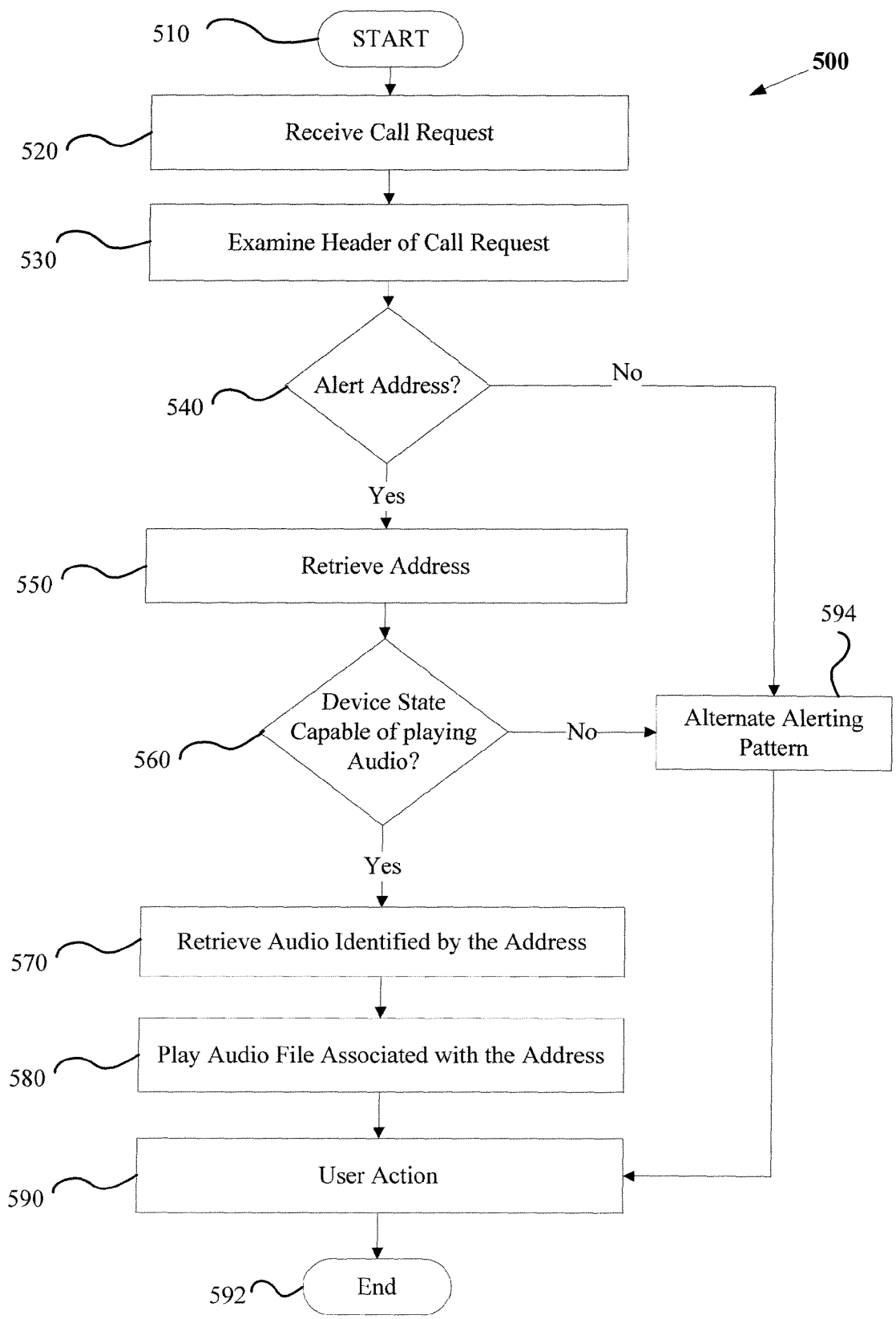
FIG. 5 is a flowchart depicting a method of providing a call announcement to a user, according to an embodiment of the present invention.

FIG. 5 is a flowchart depicting a method of providing a call announcement to a user, according to an embodiment of the present invention. According to one or more embodiments, flow chart 500 may begin at step 510.

At step 520, a call request may be received. In some embodiments, a SIP device may receive a call request from a SIP server. A SIP device may be engaged in an active call with a SIP element on an IP network. By way of non-limiting example, SIP Device 110 may be engaged in an active call with SIP Element 130. SIP Element 132 may initiate a call by sending an INVITE request to SIP Device 110. A SIP Server 122 may receive a SIP invite request from SIP Element 132 and may forward the request to SIP Device 110. For example, an INVITE request may be a SIP INVITE request that complies with RFC 3261 and may include an SDP (Session Description Protocol) offer which may be in compliance with RFC 3264, "An Offer/Answer Model with Session Description Protocol." Other protocol standards may be used. SIP server 122 may include in the INVITE request announcement text, a resource address, and/or other information, as described above with respect to FIG. 4. Alternatively, SIP server 122 may not include any additional information.

At step 530, the call request may be examined. For example, a SIP device may examine the header of a call request to determine if call announcement text or a resource address are provided. In the preferred embodiment, the SIP device examines the "alert info" field of the header of the SIP INVITE message. In some embodiments, SIP device may determine whether a talking call waiting feature has been enabled (for example, by determining whether configuration information of the SIP device specifies the talking call waiting service). This determination may be alternative to or in combination with examining the call request, depending on the implementation.

At decision block 540, if no information is provided in an "alert info" field of the call request and/or talking call waiting is not enabled, the process may flow to step 594. At decision block 540, if information is provided in an "alert info" field of the call request and/or talking call waiting is enabled, the process may flow to step 550.

At step 550, the information in the call request is retrieved. In at least one example, a SIP device may identify a URL in the "alert info" field of the call request which contains an address of a resource, announcement text and/or other information. In other examples, the SIP device may retrieve caller identification information from the call request (e.g., calling party number, calling party name, etc.).

At decision block 560, if the device state is capable of playing audio associated with the call request the process may proceed to step 570. If the device state is not capable of playing audio associated with the call request the process may continue at step 594. For example, the SIP device 110 may include configuration information that identifies the capabilities of user interface 114.

At step 570, audio associated with the call request is retrieved. In one or more embodiments, a SIP Device may process a talking call waiting URL in an "alert info" field of an invite request. Processing the talking call waiting URL may include a SIP Device sending an HTTP request to a Text To Speech (TTS) server identified by the URL. The HTTP request may be a GET request containing talking call waiting announcement text in the URL which the TTS server may process. In some embodiments where talking call waiting has been enabled and a SIP Device receives an invite request without talking call waiting announcement text in an "alert info" field of the request, the SIP Device may construct talking call waiting text from the calling party information included in the SIP Invite request. In some embodiments where talking call waiting has been enabled and a SIP Device receives an invite request without address information associated with a resource in an "alert info" field of the request, the SIP Device may construct a resource address based on configuration information stored at the SIP Device (e.g., a Text To Speech server 126 designated for use by the SIP device).

A TTS Server may process the announcement text received from the SIP device. According to an embodiment of the present invention, the TTS Server may be a separate TTS Server located on the network and identified by the URL supplied in the call request. According to other embodiments of the present invention, the SIP Server may contain TTS capabilities and may process TTS requests. By way of non-limiting example, TTS Server 126 may process the TCW text received from SIP device 110 and may synthesize an audio file, which it then sends to the SIP device. In other examples of the present invention, ITS Server 126 may return streaming audio.

In yet another embodiment, the address may specify an address of a server capable of returning a ring tone, customized greeting, sound effect, or other personalized greeting which a user has associated with the phone number of the incoming call. In such a case, the URL received by the server may include information identifying the requested audio or capable of use by the server in identifying the desired audio.

At step 580, audio associated with the call request may be played. By way of non-limiting example, SIP Device 110 may receive an audio file returned from TTS Server 126 and may interrupt the audio signal of the call from SIP element 130 while the received audio file is played to user interface 114, or intermix the audio from the audio file with the audio signal of the call from SIP element 130. Where the audio is provided in streaming format, the streamed audio may likewise be provided to user interface 114, either as an interruption to the audio signal of the call with SIP element 130 or intermixed with the audio signal of the call with SIP element 130.

At step 590, a user may decide to ignore the talking call waiting audio played at user interface 114 or may respond to the talking call waiting audio using call waiting functionality provided by user interface 114. By way of non-limiting example, the user of user interface 114 may respond to the alert notification using a "hookflash" facility of user interface 114, which may be interpreted by SIP device 110 as an indication to connect the user interface 114 to the new call associated with the received call request.

If the process is routed to step 594, an alternate alerting pattern may be provided. In some embodiments, an default alerting pattern is provided if there is no address provided in a call request. In some examples, a default alerting pattern may be an alert which is provided if a user interface device is in a state not capable of playing audio. By way of non-limiting example, a user interface device may receive an alert tone.

At step 592, the process may end.

In one or more embodiments a server receiving a call request may forward the call request for processing to a second server containing SIP capabilities as well as text to speech functionality. In such embodiments, the second server may handle all TTS requests as well as communication with a called SIP device.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   providing a web based interface to receive an announcement customization, comprising an audio label, from a called party for a number;
   receiving a call request directed to the called party;
   identifying, using at least one computer processor, announcement information comprising the announcement customization associated with the call request;
   determining that the call request is associated with a number having the announcement customization;
   customizing the announcement information based at least in part on the announcement customization;
   identifying an identifier referencing a notification alert pattern, wherein the identifier is a URL referencing the notification alert pattern;
   adding the identifier to the announcement information;
   inserting the announcement information into a field of the call request wherein the field is an alert info field in a header of a SIP INVITE message; and
   forwarding the call request.

2. The method of claim 1 wherein the call request is received at a server associated with the called party.

3. The method of claim 1, further comprising:
   determining that the called party has a call waiting service enabled.

4. The method of claim 1 wherein the announcement information further comprises one or more attributes associated with a calling party.

5. The method of claim 4 wherein the one or more attributes of the calling party comprise one or more of: a caller number, a caller name and a caller location.

6. The method of claim 1 further comprising:
   identifying an address referencing a resource for synthesizing audio for the audio label; and
   adding the address to the announcement information.

7. The method of claim 6 wherein the address is a URL referencing a server with text to speech synthesis functionality.

8. The method of claim 1, wherein identifying the announcement information includes generating announcement text based on one or more attributes of the calling party and including the announcement text in the announcement information.

9. The method of claim 8 wherein the audio retrieved is an alerting pattern identified by a URL in the call request.

10. The method of claim 8 further comprising:
    determining a user interface device state; and
    sending notification information corresponding to the device state.

11. The method of claim 1, wherein identifying the announcement information includes selecting a notification alert pattern based on one or more attributes of the calling party, and including an indicator of the notification alert pattern in the announcement information.

12. A non-transitory computer readable media comprising: code to perform the acts of the method of claim 1.

13. A method comprising:
    transmitting via a web based interface announcement customizations for one or more numbers;
    receiving a call request from a packet-switched network;
    identifying, using at least one computer processor, announcement information associated with the call request wherein identifying the announcement information comprises identifying information located in an alert info field of the call request and wherein further the announcement information includes a URL;
    determining that the call request is associated with a number having a customized announcement comprising an audio label specified by and recorded by a called party;
    customizing the announcement information based at least in part on the customized announcement;
    identifying an identifier referencing a notification alert pattern, wherein the identifier is a URL referencing the notification alert pattern;
    adding the identifier to the announcement information;
    retrieving audio associated with the announcement information from a network element communicatively coupled to the packet-switched network; and
    providing the audio to a user interface.

14. The method of claim 13 wherein the URL references a server with text to speech synthesis functionality.

15. The method of claim 13 wherein retrieving the audio comprises sending an HTTP request to a server with text to speech functionality, the HTTP request including announcement text, and receiving a synthesized audio file generated from the announcement text contained in the HTTP request.

16. A non-transitory computer readable media comprising: code to perform the acts of the method of claim 13.

17. A system comprising:
  a web based interface to receive announcement customizations for one or more numbers;
  a server communicatively coupled to an IP network to:
    receive a SIP INVITE directed to a called party from the IP network,
    determine that the called party has a call waiting service enabled,
    identify announcement information based on calling party information in the SIP INVITE,
    customize the announcement information in the event the SIP INVITE is associated with a number having a customized announcement, wherein the customization is based at least in part on a customization specified by the called party for a number associated with a calling party and comprises at least in part an audio label;
    identify an identifier referencing a notification alert pattern, wherein the identifier is a URL referencing the notification alert pattern;
    add the identifier to the announcement information;
    insert the announcement information comprising announcement text corresponding to the audio label into the SIP INVITE into an alert info field,
    transmit the SIP INVITE; and
  a SIP device associated with the called party and coupled to the server, the SIP device including a SIP user agent, to:
    receive the SIP INVITE from the server,
    identify the announcement information in the SIP INVITE,
    retrieve audio information from a network element communicatively connected to the IP network based on the announcement information, and
    provide the audio information to a user interface connected to the SIP device, wherein the audio information is a conversion of the announcement text to speech.

18. The system of claim 17 wherein the audio information comprises one or more audio files.

* * * * *